Aug. 21, 1923.

J. L. RUFTY

TRAP

Filed April 24, 1923

1,465,528

Patented Aug. 21, 1923.

1,465,528

UNITED STATES PATENT OFFICE.

JAMES LEE RUFTY, OF STONY POINT, NORTH CAROLINA.

TRAP.

Application filed April 24, 1923. Serial No. 634,350.

*To all whom it may concern:*

Be it known that I, JAMES LEE RUFTY, a citizen of the United States of America, and resident of Stony Point, in the county of Alexander and State of North Carolina, have invented certain new and useful Improvements in Traps, of which the following is a specification.

This invention relates to animal traps, and has special reference to the type of animal trap which is known as a jaw trap.

In ordinary construction of traps of this kind, two jaws are employed, which are generally of arcuate form and which are pivoted at the ends of the arcs to a base plate. A leaf spring is positioned on the base plate so that its ends are free from the plate, the spring being secured in the middle, and these ends urge the jaws to closed position. With this construction there is no means of regulating the tension of the leaf spring, and when the spring becomes weakened from any cause, the entire trap must be discarded.

The principal object of the present invention is to provide an improved general construction of trap wherein special spring means are employed.

A second important object of the invention is to provide an improved spring actuated jaw trap wherein a novel arrangement of spring permits of the adjustment of the trap so that different sized animals may be caught thereby without undue injury to the pelt, while at the same time securely holding the animal.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
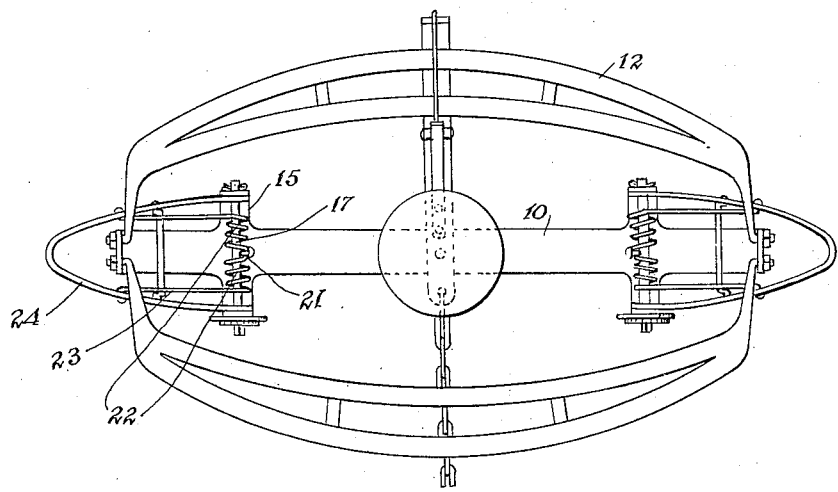
Fig. 1 is a plan view of a trap constructed in accordance with this invention.
Figure 2:
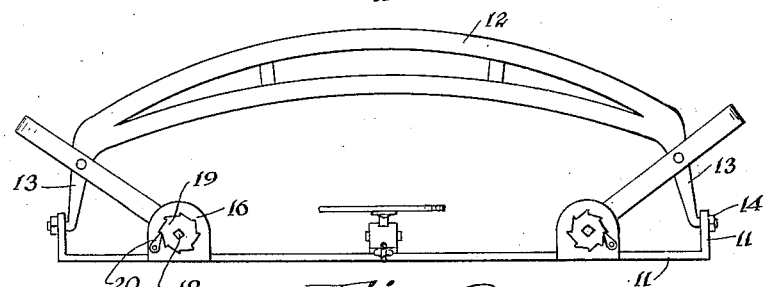
Fig. 2 is a side elevation thereof.
Figure 3:
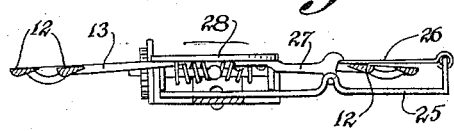
Fig. 3 is a transverse section through the trap.

In the embodiment of the invention herein illustrated, there is provided a base plate 10, having at each end an upstanding portion 11. The jaws of this trap are of the usual arcuate form as shown at 12, and having laterally extending ends 13, which are pivoted in the upstanding portions 11 of the base plate. These jaws are tapered so as to allow the under edges of the jaws to engage the leg or other part of the animal being trapped just a little before the upper part. Both jaws being so tapered makes the under edges of the jaws embed themselves in the animal's leg. Preferably, the pivotal portions of the jaws 13 are threaded and provided with nuts 14 to prevent these ends from being pulled out of the base plate, and thus freeing the jaws. Adjacent each end the base plate is extended transversely, as shown at 15, and the ends of these transverse portions are turned upward to provide bearing lugs 16 wherein are journalled the shafts 17.

It will thus be observed that there is a transverse shaft at each end of the trap. One end of each of these shafts is provided with a square 18 to receive a key, and on this end is secured a ratchet 19, which is engaged by a pawl 20 carried by the upstanding lug 16 at this end. Projecting from the middle of each shaft is a pin 21. At 22 is a spring which is formed from a single length of one-eighth inch rod or wire, which is doubled in the middle, and has this doubled portion engaging the pin 21. This spring has its ends coiled around the respective shafts 17, each end being coiled in the same direction from the doubled portion so that there is produced a right and left-handed coil at each side of the doubled portion, as indicated at 22. The terminal portions of these coils extend laterally from the springs, as at 23, and engage yoke members 24 which engage the ends 13 of the jaws, and thus the springs urge these yoke members and the jaws to closed position.

It will be obvious from this construction that the tension of the spring may be regulated by turning the respective shafts with a suitable clock key, the pawl and ratchet arrangement holding the springs in adjusted position.

Extending laterally from the middle of the base plate 10 is a trigger plate 25, which carries a trigger 26 pivoted at its outer end and arranged to fold over one of the jaws 12, and be held in such position by means of a latch 27 carrying a treadle 28 positioned between the jaws when the latter are open. Thus, when the animal steps on the treadle, the latch releases the trigger 26, and the jaws snap closed under the influence of the springs.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is desired to include all such as properly come within the scope claimed.

Having thus described the invention, what is claimed as new, is:

1. An animal trap of the kind described including a base plate, a pair of cooperating jaws pivoted at each end to said base plate, independent spring means at each end of the plate engaging the jaws and urging them to close, said spring means being mounted for adjustment of their tensions, and means to hold the springs releasably in tension adjusted positions.

2. An animal trap of the kind described including a base plate, a pair of cooperating jaws having laterally extending ends pivoted to the base plate at opposite ends of said plate, a transverse shaft journalled at each end of said plate, a coil spring on each shaft having one terminal portion connected to the shaft, means actuated by the other end of said spring for closing said jaws, and means to hold the shaft adjustably against rotation by said spring.

3. An animal trap of the class described including a base plate, a pair of cooperating jaws having laterally extending ends pivoted to the base plate at opposite ends of said plate, transverse shafts each journalled at a respective end of said plate, a spring on each shaft, each spring consisting of a doubled spring rod having the portions adjacent the doubled part coiled in like directions around said shaft whereby to form a right and left hand spiral, the terminal portions of said coils extending laterally therefrom, means engaged by the terminal portions of and actuated by the springs for closing said jaws, and means to hold the shafts adjustably against rotation.

4. An animal trap of the class described including a base plate, a pair of cooperating jaws having laterally extending ends pivoted to the base plate at opposite ends of said plate, transverse shafts each journalled at a respective end of said plate, a spring on each shaft, each spring consisting of a doubled spring rod having the portions adjacent the doubled part coiled in like directions around said shaft whereby to form a right and a left hand spiral, the terminal portions of said coils extending laterally therefrom, a yoke at each end of the plate having its arms pivoted on the respective shaft and having its central portion engaging beneath the ends of the jaws, said springs having their terminal portions engaging beneath said yokes to raise the yokes and close the jaws, a ratchet fixed on each shaft, and a pawl mounted at each end of the plate engaging the respective ratchet.

JAMES LEE RUFTY.